US009546584B2

(12) United States Patent
Qi

(10) Patent No.: US 9,546,584 B2
(45) Date of Patent: Jan. 17, 2017

(54) MULTI-STAGE SCR SYSTEM

(71) Applicant: Baohua Qi, Marietta, GA (US)

(72) Inventor: Baohua Qi, Marietta, GA (US)

( * ) Notice: Subject to any disclaimer, the term of this patent is extended or adjusted under 35 U.S.C. 154(b) by 0 days.

(21) Appl. No.: 14/463,629

(22) Filed: Aug. 19, 2014

(65) Prior Publication Data

US 2015/0052878 A1 Feb. 26, 2015

Related U.S. Application Data

(60) Provisional application No. 61/868,063, filed on Aug. 20, 2013.

(51) Int. Cl.
*F01N 3/24* (2006.01)
*F01N 3/20* (2006.01)
*F01N 13/00* (2010.01)

(52) U.S. Cl.
CPC ............ *F01N 3/208* (2013.01); *F01N 3/2066* (2013.01); *F01N 13/0093* (2014.06); *F01N 2560/026* (2013.01); *F01N 2610/02* (2013.01); *F01N 2610/08* (2013.01); *F01N 2610/14* (2013.01); *F01N 2900/08* (2013.01); *F01N 2900/12* (2013.01); *F01N 2900/1402* (2013.01); *Y02T 10/24* (2013.01)

(58) Field of Classification Search
CPC .............. F01N 13/009; F01N 2610/085; F01N 2610/1413; F01N 2610/142; F01N 2610/1466
See application file for complete search history.

(56) References Cited

U.S. PATENT DOCUMENTS

2005/0284134 A1* 12/2005 Radhamohan ........ F01N 3/0814
60/286
2011/0162347 A1* 7/2011 Katare ..................... F01N 3/10
60/274

FOREIGN PATENT DOCUMENTS

DE 102010040453 A1 * 3/2012 ........... F01N 3/2066

OTHER PUBLICATIONS

Machine translation of DE 102010040453 A1, accessed on Jan. 8, 2016.*

* cited by examiner

*Primary Examiner* — Jonathan Matthias

(57) ABSTRACT

A multi-stage SCR system including a front reductant injecting device, a front mixer, a front SCR catalyst, a back reductant injecting device, a back mixer, a back SCR catalyst, and a DCU. The front and back reductant injecting devices receives reductant from an air-driven pump, which includes a liquid supply tank, a pressure tank, and solenoids control valves. Under pressure provided by a compress air source, reductant is pressed into the front and back reductant injecting devices from the air-driven pump. The front and back reductant devices also have flow-back paths fluidly connected to a reductant tank. And in purging or maintenance heating, the flow-back paths can be energized open. In the multi-stage SCR system, a DOC can be further positioned in between the two SCR devices for increasing the deNOx efficiency in the back SCR catalyst, so that the system is less sensitive to catalyst aging.

17 Claims, 20 Drawing Sheets

MULTI-STAGE SCR SYSTEM

This present application claims priority from U.S. provisional application No. 61/868,063 having the same title as the present invention and filed on Aug. 20, 2013.

TECHNICAL FIELD OF THE INVENTION

The present invention relates to an exhaust system for an internal combustion engine, and more specifically, to an exhaust system with a SCR (Selective Catalytic Reduction) apparatus for reducing NOx (Nitrogen Oxides) in exhaust gas of an internal combustion engine.

BACKGROUND OF THE INVENTION

Environmentally harmful species in exhaust gas emitted from an internal combustion engine, such as hydrocarbons (HC), carbon monoxide (CO), particulate matters (PM), and nitric oxides (NOx) are regulated species need to be removed therefrom. In lean combustion engines, due to the existence of large amount oxygen excess, passive means without extra dosing agents, such as that using a three-way catalyst, normally are not able to effectively remove the oxidative specie NOx, as that in most of spark-ignition engines. To reduce NOx in lean combustion engines, a variety of active means with reducing agents (reductants) being dosed in exhaust gas are developed. In these technologies, a dosing amount of reductant is injected into exhaust gas, and the result mixing gas flows into a SCR catalyst, where the reductant selectively reacts with NOx generating non-poisonous species, such as nitrogen, carbon dioxide, and water.

A variety of reductants, such as ammonia ($NH_3$), HC, and hydrogen ($H_2$) can be used in SCR systems. Among them, ammonia SCR is used most broadly due to high conversion efficiency and wide temperature window. Ammonia can be dosed directly. However, due to safety concerns and difficulties in handling pure ammonia, in ammonia SCR systems, normally ammonia is obtained from a urea solution through thermolysis and hydrolysis, and the urea solution in these applications is also called reductant. In mobile applications, typically a eutectic solution of urea, i.e. a 32.5% wt urea solution, is used.

In a SCR system, dosing accuracy significantly affects NOx control performance, especially when engine out NOx level is high. For example, if engine out NOx is 1000 ppm, with a NSR (Normalized Stoichiometric Ratio) of 1.0, 1000 ppm ammonia is needed. If an uncertainty of 5% exists in dosing control, then 50 ppm of ammonia could be over- or under-generated. Though in transient, SCR catalyst has certain capability storing ammonia, clamping the effects of under-dosing and over-dosing, in average, these effects may still cause issues. In the example above, if the SCR system is tuned for an average doser with zero storage usage, then an under-dosing doser may create 50 ppm NOx slip in average, which is almost 0.3 g/bhp·hr in normal operations. Compared to the US 2010 emission standard of 0.2 g/bhp·hr, it is 150% uncertainty. This calculation just includes the doser uncertainty. Other important factors, such as NOx sensor error, urea decomposition error, and exhaust flow rate error, also contribute to the overall control uncertainty.

Using SCR catalyst with large storage capability (e.g. a Cu-zeolite catalyst) together with an AMOX (AMmonia OXidation) catalyst desensitizes NOx control to NSR. Thereby uncertainties in dosing system and sensors can be compensated through over-dosing. However, relying on the storage capability of SCR catalyst and AMOX could cause aging issues, since both of the storage capability of SCR catalyst and the selectivity of AMOX are subject to aging effects. An aged AMOX tends to oxidize ammonia slip back to NOx, and an aged SCR catalyst has lower deNOx efficiency. Therefore, the aging of the catalysts may cause NOx slips with over-dosing, especially when temperature variation releases stored ammonia in SCR catalyst.

All these issues cause difficulties in applications in which high deNOx efficiency has to be maintained. For example, to reach the requirements of 0.2 g/bhp·hr (emission limit) to 0.4 g/bhp·hr (OBD limit) set by the US2010 and CARB2016 emission regulations, when an engine out NOx level is 4.0 g/bhp·hr, a deNOx efficiency of 95% is needed for normally operations and when the deNOx efficiency drops below 90%, a fault needs to be generated. The high efficiency requirements for SCR systems cause difficulties in controlling NOx level and detection failures due to effects of uncertainties in dosing system and sensors, resulting in high system and warranty costs.

To lower the deNOx efficiency requirement, engine out NOx concentration has to be limited to a low level with EGR (Exhaust Gas Recirculation) technology, and retarded fuel injection. However, too much EGR and fueling retard may deteriorate engine operating performance and fuel economy. Additionally, a trade-off between NOx emission and PM emission exists in engine control. Lowering engine out NOx normally causes increase in PM emission and fuel economy is further deteriorated due to that more energy needs to be consumed in regenerating the DPF which traps PM.

In an SCR system, under a given condition, deNOx efficiency is limited by the effective volume of its catalyst, which is determined by the uniformity of exhaust gas and reductant, and the catalyst volume, while most of SCR reactions and catalyst aging happen at the front end of the catalyst. To obtain higher deNOx efficiency with lower warranty costs, a multi-stage SCR system including more than one SCR catalysts and dosing apparatus can be used. In the multi-stage SCR system, exhaust gas with unreacted ammonia can be re-mixed with newly dosed reductant, and thereby a better uniformity and higher deNOx efficiency can be achieved. At the same time, the isolation between a front SCR device, in which most of aging happens, and a back SCR device with less aging decreases difficulties in detecting catalyst failures and lowers system warranty cost, since more likely only a smaller front SCR needs to be replaced in case of a catalyst failure.

However, a multi-stage SCR normally needs a complex structure, which may significantly increase system cost or cause other issues. For example, when air assisted dosers are used in a multi-stage SCR system, each SCR needs a dosing module and an independent control. The system complexity thus is significantly increased. If airless dosers are used, adding a new dosing branch creates issues in pressure control and dosing accuracy due to the effects of injector actions to reductant pressure. Also, in a purge process, when air enters from one pressure line to the pump in the airless doser, the pump pressure could drop significantly, causing issues in pulling reductant residue in the other pressure line, resulting in purging failures.

To solve the problems in multi-stage SCR systems so that high deNOx efficiency and easy failure detection can be obtained with simple structure and low warranty cost, a primary object of the present invention is to provide a multi-stage SCR system with a scalable dosing system in which a reductant delivery branch can be added with minimum effect to it structure and dosing performance.

A further objective of the present invention is to provide a multi-stage SCR system with more uniform exhaust flow, so that higher system deNOx efficiency can be obtained.

Another objective of the present invention is to provide a multi-stage SCR system in which no extra sensor is needed compared to a single-stage SCR system.

Yet another objective of the present invention is to provide a multi-stage SCR system in which deNOx efficiency in the rear portion of the overall SCR catalyst can be higher than that of the first stage SCR, so that the system is less sensitive to catalyst aging.

BRIEF SUMMARY OF THE INVENTION

The present invention provides an apparatus and method for delivering a reductant for reducing NOx in exhaust gas emitted from an internal combustion engine. More specifically, this apparatus includes a front reductant injecting device, a front SCR device, a back reductant injecting device with a mixer following it, a back SCR device, and a DCU (Dosing Control Unit). In an embodiment of the present invention, the front SCR device includes a front SCR catalyst and an optional AMOX, while the back SCR device includes a back SCR catalyst and an AMOX. A NOx model is used for estimating engine out NOx, which is used by the DCU for controlling the front reductant injecting device in releasing a dosing quantity of reductant. An upstream NOx sensor is positioned in between the front SCR device and the back reductant injecting device. And sensing values obtained from the upstream NOx sensor are used in a feedback control for compensating dosing rate commands for the front reductant injecting device and for generating dosing rate commands for the back reductant injecting device. Downstream from the back SCR device, a downstream NOx sensor is used for providing NOx sensing values used for compensating dosing commands for the front and back reductant injecting devices. In controlling reductant dosing, the temperatures of the front and back SCR devices are also used. These temperatures are estimated by using sensing values obtained from three temperature sensors located respectively upstream from the front SCR device, downstream from the back SCR device, and in between the front SCR device and the back SCR device. Exhaust gas passing through the front SCR device is re-mixed in the mixer together with newly dosed reductant released from the back reductant injecting device, and the mixed gas then enters the back SCR device for further NOx reduction. The mixing process is critical for obtaining higher deNOx efficiency.

Reductant is provided to the front and the back injecting devices by an air driven pump, which includes a liquid supply tank (LST) and a pressure tank (PT), control solenoids, and a reductant tank. A pressure sensor is positioned in the PT, and the reductant in the PT is supplied from the LST, which has a liquid port fluidly coupled to the reductant tank and a gas port fluidly coupled to compressed air and ambient through a three-way solenoid valve. When the three-way solenoid valve fluidly connects the gas port to ambient, compressed air in the liquid supply tank is released, and reductant then flows from the reductant tank to the LST. Reductant in the LST is pressed into the PT when the three-way solenoid valve connects the gas port of the LST to compressed air. The PT has a liquid port fluidly connected to the front and the back injecting devices, and a gas inlet port fluidly coupled to compressed air through a first two-way solenoid valve and fluidly coupled to ambient through a second two-way solenoid valve for controlling reductant pressure in the PT. In the air-driven pump, the PT functions like a common rail in a fuel injection system and compressed air in the PT acts as an air buffer. This structure desensitizes reductant pressure from injecting actions and makes the system scalable for more injecting devices.

In the apparatus, the inlets of the front and the back injecting devices are also fluidly coupled to the reductant tank through flow control valves. After dosing finishes, in a purging process, reductant residue can be pressed back to the reductant tank by energizing the flow control valves open. Pressing reductant in each dosing branch back into the reductant tank avoids the problems caused by sudden decrease of pressure as seen in airless dosers. Furthermore, the flow control valves can also be energized open to cycle warm reductant in keeping reductant in passages from being frozen when ambient temperature is low, and reductant flow rate in passages is low. With the cycling of warm reductant, electrical heating means is no longer required.

In another embodiment of the present invention, a DOC (Diesel Oxidation Catalyst) is positioned in between a front SCR device and a back reductant injecting device. Through the DOC, more $NO_2$ can be generated and thereby the deNOx efficiency of the back SCR device is increased with the help of fast SCR reactions among $NO_2$, NO and $O_2$. Higher deNOx efficiency in the back SCR device decreases the requirement to the deNOx efficiency in the front SCR device, and makes the system performance less sensitive to catalyst aging.

DETAILED DESCRIPTION OF THE INVENTION

Figure 1:
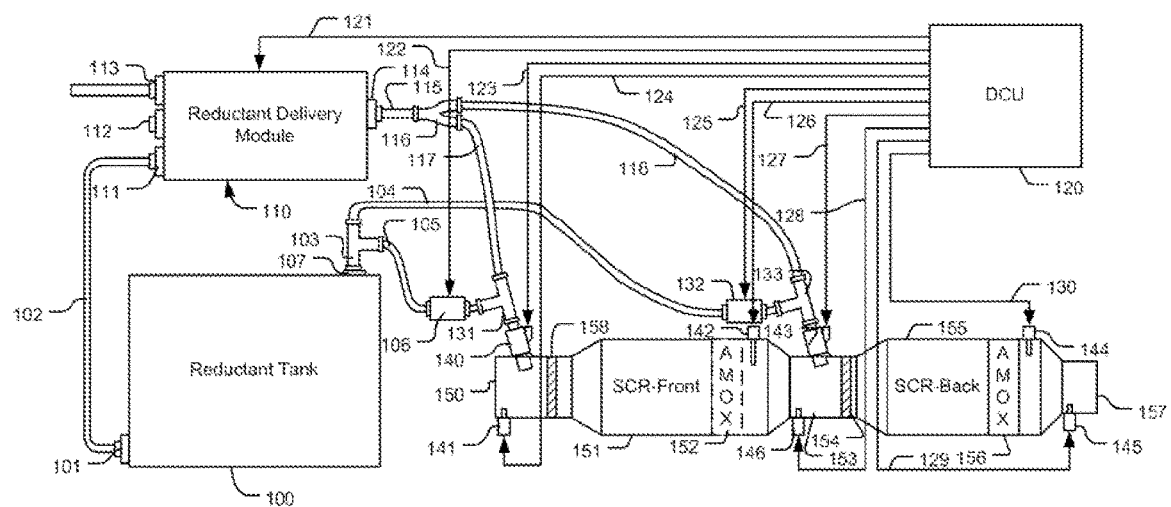
FIG. 1 is a schematic representation of a two-stage SCR system.

Referring to FIG. 1, a two-stage SCR system includes a front SCR device and a back SCR device. The front SCR device has a SCR catalyst 151 and an optional AMOX 152 inside, and the catalyst 151 is at the front of the AMOX 152. Upstream from the front SCR device, an injector 140, which is controlled by a DCU 120 through signal lines 123, is installed on an exhaust air passage 150 for delivering reductant into exhaust flow, and a temperature sensor 141 is positioned upstream from the injector 140 for providing temperature sensing signals to the DCU 120 through signal lines 124. In between the injector 140 and the catalyst 151, in the exhaust air passage 150, a mixer 158 is used for creating a uniform exhaust flow. Downstream from the AMOX 152, a NOx sensor 142 electrically connected to the DCU 120 through signal lines 126 is used for measuring NOx concentration in exhaust gas, and an exhaust air passage 153 connects the front SCR device to the back SCR device, inside which a catalyst 155 is followed by an AMOX 156. On the exhaust air passage 153, a temperature sensor 146 reports sensing values of exhaust gas temperature to the DCU 120 through signal lines 128, and another injector 143, which is controlled by the DCU 120 through signal lines 127, is used for delivering reductant into exhaust gas. In between the injector 143 and the catalyst 155, a mixer 154 is used for creating a uniform exhaust flow. Downstream from the AMOX 156, a NOx sensor 144, which communicates to the DCU 120 through signal lines 130, is used for providing NOx concentration sensing information. And on an exhaust air passage 157, a temperature sensor 145 sends sensing signals to the DCU 120 through signal lines 129. In the system, the reductant released from the injector 140 is mixed with exhaust gas and the mixed gas enters the front SCR device through the mixer 158. In the front SCR device, NOx in the mixing gas reacts with the reductant, and then the result gas is dosed again with the reductant released from the injector 143. The mixed gas flows through a mixer 154 and enters the back SCR device for further NOx reduction. Compared to a system with a single SCR device, the re-mixing process through the mixer 154 increases uniformity of exhaust gas and thereby increases system deNOx efficiency. A variety types of mixers, such as baffle mixers, mesh mixers, louver mixers, and helical or twisting mixers can be used for the mixer 154 and the mixer 158.

In the SCR system of FIG. 1, reductant is stored in a reductant tank 100, and though a port 101, a passage 102, and a port 111, reductant enters a reductant delivery module 110, inside which a PCU (Pump Control Unit, not shown in FIG. 1) communicates to the DCU 120 through signal lines 121. The reductant delivery module 110 has a port 113 fluidly connected to a compressed air source (not shown in FIG. 1), and a vent 112 for releasing air into ambient. Under pressure provided by the compressed air source, reductant in the reductant delivery module 110 flows out through a port 114, which is fluidly connected to the inlet port of a Y connector 116 through a passage 115. The Y connector 116 has an outlet port fluidly coupled to the injector 140 through a passage 117 and a T connector 131, and another outlet port fluidly coupled to the injector 143 though a passage 118 and a T connector 133. To drain reductant residue after a dosing process completes, a solenoid valve 106 controlled by the DCU 120 through signal lines 122 fluidly connects the T connector 131 to a T connector 103 through a passage 105. The T connector 103 has another port fluidly connected to a port 107 of the reductant tank 100, and a third port fluidly coupled to the T connector 133 through a passage 104 and a solenoid valve 132, which is controlled by the DCU 120 through signal lines 125.

Figure 2:
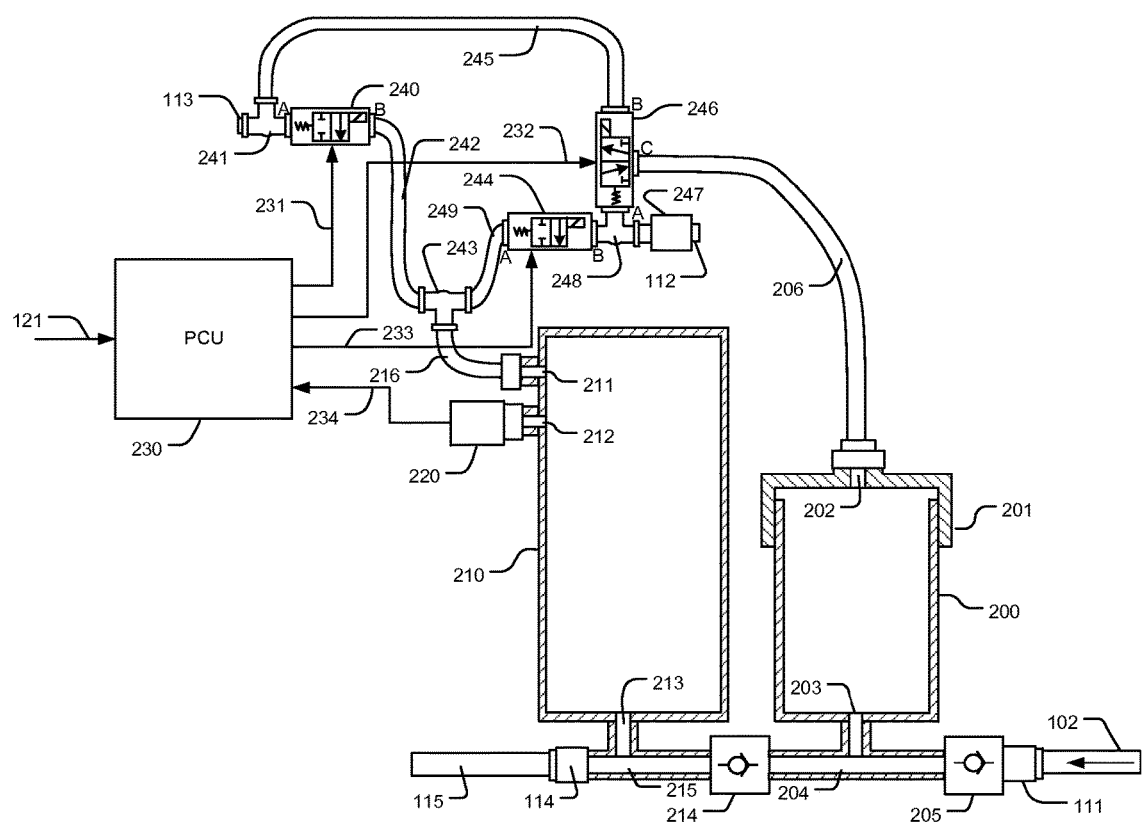
FIG. 2 depicts an air driven hydraulic pump system in a reductant delivery module.

In the reductant delivery module 110 of FIG. 1, an air driven pump can be used for driving reductant from the port 111 to the port 114. An embodiment of the air driven pump is shown in FIG. 2. In the air driven pump, a PT 210 has a port 213 fluidly connected to a reductant passage 215, and a LST 200 has a port 203 fluidly connected to a reductant passage 204. The reductant passage 204 is fluidly connected to the port 111 through a check valve 205 and fluidly connected to the reductant passage 215 through a check valve 214. With the check valves 205 and 214, reductant can only flow from the port 111 to the LST 200 and from the LST 200 to the reductant passage 215, which is fluidly connected to the port 114. On the top of the LST 200, a cap 201 is screwed and a port 202 in the cap 201 is fluidly coupled to the port C of a three-way solenoid valve 246 through an air passage 206. The port A of the solenoid valve 246 is fluidly connected to a T connector 248, which has another port fluidly coupled to the port B of a two-way normally closed solenoid valve 244 and a third port fluidly coupled to the port 112 through an optional muffler 247. The solenoid valves 244 and 246 are controlled by a PCU 230 through signal lines 233 and 232 respectively. Through an air passage 245, the port B of the solenoid valve 246 is fluidly coupled to a T connector 241, which has another port fluidly connected to the port A of a two-way normally closed solenoid valve 240, and a third port fluidly connected to the port 113. The solenoid valve 240 is controlled by the PCU 230 through signal lines 231, and its port B is fluidly coupled to a T connector 243 through an air passage 242. The T connector 243 has another port fluidly coupled to a port 211 of the PT 210 through an air passage 216, and a third port fluidly connected to the port A of the solenoid valve 244 through an air passage 249. The solenoid valve 246 is used for controlling air flow to the LST 200, while the solenoids 240 and 244 are employed in controlling air pressure in the PT 210. The pressure inside the PT 210 is measured by a pressure sensor 220 mounted to a port 212, and sensing signals generated by the pressure sensor 220 are sent to the PCU 230 through signal lines 234.

Referring back to FIG. 1, in the SCR system, the DCU generates two reductant dosing rates based on sensing signals obtained from the temperature sensors 141, 146, and 145, NOx sensors 142 and 144, and engine operating information, such as engine speed, fueling rate and timing, fresh air flow rate, charge air flow rate and pressure, and ambient temperature and humidity, which can be provided by an ECU (Engine Control Unit, not shown in FIG. 1) through communication.

In the SCR system of FIG. 1, the multi-stage structure allows a NOx model used in SCR controls for estimating engine out NOx level. In an engine, NOx level is determined by engine operating modes and ambient conditions, therefore, it can be estimated by using engine operating parameters, the values of which can be obtained from sensors, such as engine speed sensors, EGR (Exhaust Gas Recirculation) valve position sensors, fresh air mass-flow sensors, EGR flow sensors, ambient pressure sensors, and ambient humidity sensors, and engine controls, such as fueling rate and timing. However, due to sensing accuracy and difference in response time, estimate values calculated from mode-based NOx sensing is not as accurate as that obtained from physical sensors. The inaccuracy of mode-based NOx sensing makes it incapable of being used for applications with deNOx efficiency higher than 80%, resulting in that physical NOx sensors are required in most applications with Euro VI or US 2010 regulations. In the system of FIG. 1, the multi-stage structure allows high overall deNOx efficiency obtained with a low front SCR efficiency. For example, when the front SCR deNOx efficiency is 80%, and the back SCR deNOx efficiency is 85%, the total deNOx efficiency is 97%. The low deNOx efficiency requirement makes it possible to use a model based NOx sensing in estimating engine out NOx level.

Figure 3A:
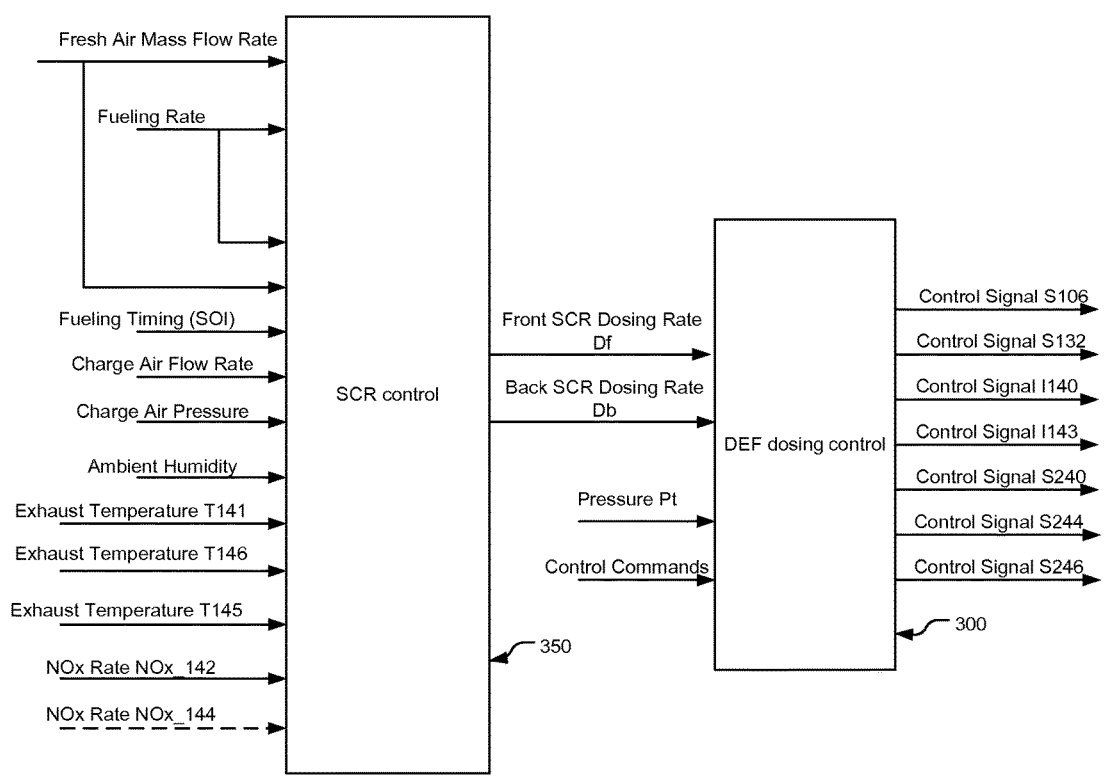
FIG. 3a is a block diagram of a SCR control system.

An example of a SCR control system is shown in FIG. 3a. In this system, a SCR control unit 350 is used for generating a front SCR dosing rate Df and a back SCR dosing rate Db for a reductant dosing control unit 300. Inputs to the SCR control unit 350 include a fresh air mass flow rate, fueling rate values, fueling timing values, a charge air flow rate, a charge air pressure, an ambient humidity, exhaust temperature sensing values T141, T146, and T145 obtained respectively from the temperature sensors 141, 146, and 145, and NOx sensing values NOx_142 and NOx 144 obtained respectively from the NOx sensors 142 and 144. The reductant dosing control unit 300 is used to generate control signals S106, S132, S240, S244, and S246 respectively for solenoid valves 106, 132, 240, 244, and 246, and control signals 1140 and 1143 respectively for injectors 140 and 143. The reductant dosing control unit 300 has four inputs. Except the dosing rate Df and Db, a pressure Pt obtained from the pressure sensor 220, and control commands, which determines status of a dosing control, are also used in generating the control signals.

Figure 3B:
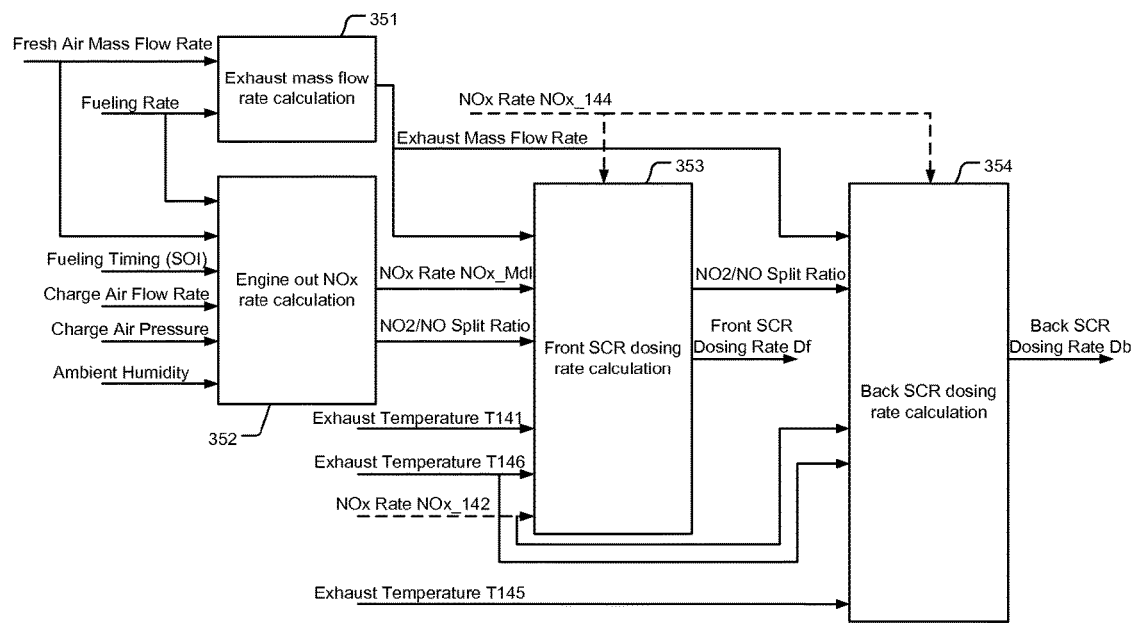
FIG. 3b is a block diagram of a SCR control unit in a SCR control system.

In the SCR control unit 350, as shown in FIG. 3b, the fresh air mass flow rate and the fueling rate values are used in a block 351 in estimating an exhaust mass flow rate, and in a block 352 in estimating an engine out NOx rate, NOx_Mdl, and a NO2/NO split ratio, together with the fueling timing values, the charge air flow rate, the charge air pressure, and the ambient humidity. The temperatures T141 and T146 are used in a block 353 in calculating an average temperature of the front SCR, and the dosing rate Df is calculated according to the exhaust mass flow rate, the NOx_Mdl values, and the NO2/NO split ratio. To have a better control performance, a feedback control can be further used in generating the dosing rate Df with NOx sensing values NOx_142 and NOx_144. The NO2/NO split ratio is also adjusted in the block 353, and the result values together with the exhaust mass flow rate, the NOx_142 values, the temperature T146, and a temperature sensing value T145 obtained from the temperature sensor 145 are used in a block 354 for calculating the dosing rate Db. As that in the block 353, the temperatures T145 and T146 are used in calculating an average temperature in the back SCR, and to have a better control performance, a feedback control with the NOx_144 sensing values can be used in adjusting dosing rate.

Figure 3C:
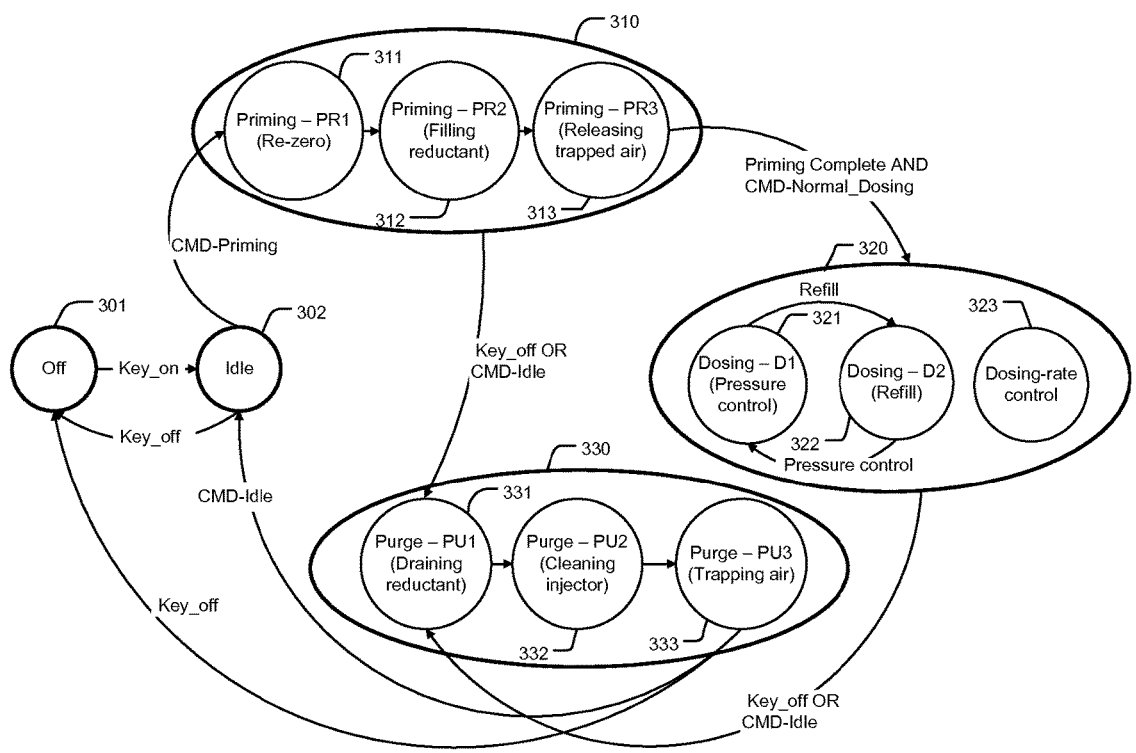
FIG. 3c is a state-machine diagram of a reductant dosing control unit in a SCR control system.

Referring back to FIG. 3a, the reductant dosing control unit 300 can be realized with a state machine. An example of such a state machine is shown in FIG. 3c. In the state machine, there are five main states: an Off state 301, an Idle state 302, a Prime state 310, a Normal-dosing state 320, and a Purge state 330. Upon a Key-on flag, the routine goes from the Off state 301 into the Idle state 302. If a command CMD-Priming is received, then the routine enters the Prime state 310, otherwise, if a Key-off flag is received, then the state machine goes back to the Off state 301. The Prime state further includes three sub-states: a PR1 sub-state 311, in which the reductant volume in the PT 210 is re-zeroed, a PR2 sub-state 312 for filling the PT 210 with reductant, and a PR3 sub-state for releasing trapped air in the injecting devices 140 and 143. After the Prime state is completed, if a command CMD-Normal_dosing is received, then the routine enters the Normal-dosing state 320, otherwise, if a Key-off flag or a CMD-Idle command is obtained, then the routine goes into the Purge state 330. The Normal-dosing state also includes three sub-states: a D1 sub-state 321 in which the LST 200 is refilled, a D2 sub-state 322 for refilling reductant from the LST 200 to the PT 210, and a Dosing-rate control sub-state 323, in which reductant delivery rate is controlled with a PWM (Pulse Width Modulation) method. In the D1 sub-state and the D2 sub-state, reductant pressure in the PT 210 is controlled within a predetermined range. The Dosing-rate control sub-state 323 is independent to the D1 sub-state 321 and the D2 sub-state 322, i.e., in the Normal-dosing state, the Dosing-rate control sub-state 323 runs continuously, while the D1 sub-state 321 and D2 sub-state 322 run alternately. Running in the Normal-dosing state, if a command CMD-Idle or a Key-off flag is received, the routine enters the Purge state 330. As the Normal-dosing state 320, the Purge state 330 also includes three sub-states: a PU1 sub-state 331 for draining reductant in passages, a PU2 sub-state 332, in which reductant residue in injecting devices 140 and 143 is released into exhaust pipe, and a PU3 sub-state 333, in which a certain amount of compressed air is trapped in the PT 210 for keeping the PT 210 from being refilled.

Among all the states, the Off state 301 and the Idle state 302 are simple states. In the Off state 301, all actuators including the solenoid valves and the injecting devices, and reductant temperature control are de-energized. In the Idle state 302, reductant temperature control is enabled while actuators are still de-energized.

Figure 4A:
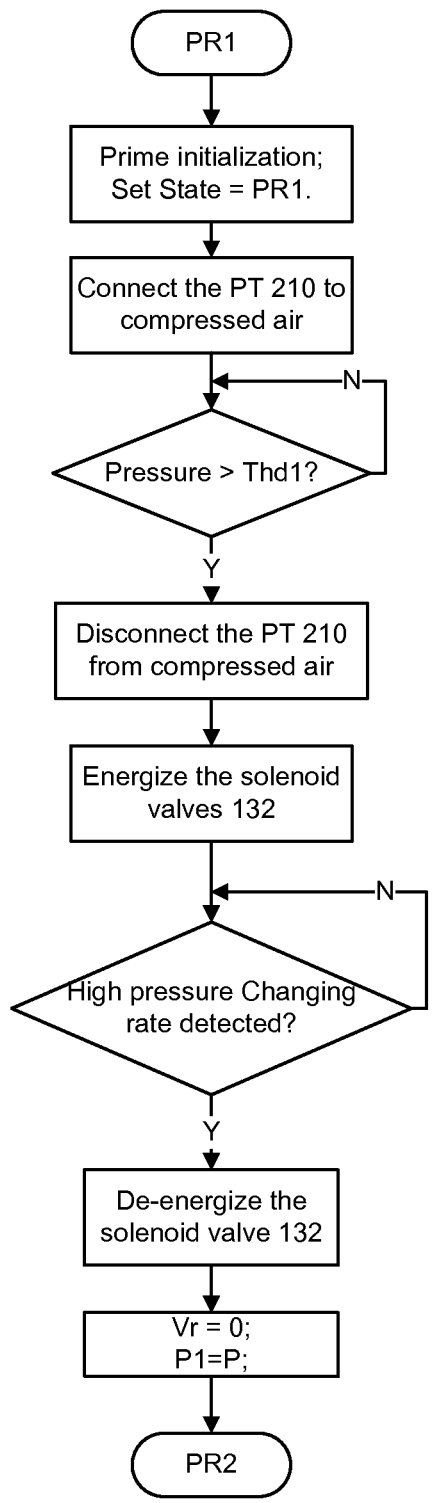
FIG. 4a is a flow chart of a routine for a sub-state PR1 in a Priming state.

In the Priming state 310, the sub-state PR1 can be realized with a routine depicted in FIG. 4a. In this routine, the system is initialized at the beginning. The initialization process, which includes de-energizing the solenoid valves and the injecting devices, is to turn off the system before the priming process starts. After the initialization, the state flag is set to PR1 and the PT 210 is connected to compressed air to build pressure in it. When the pressure in the PT 210 is higher than a threshold Thd1, the PT 210 is disconnected from compressed air, and the solenoid valve 132 is energized. Under the air pressure, reductant residue in the PT 210 flows back to the reductant tank 100. When a high pressure changing rate is detected, indicating the PT 210 and the path from the PT 210 to the solenoid valve 132 is empty, the solenoid valve 132 is de-energized, and the routine enters the sub-state PR2 after a variable, Vr, which is an indication of a reductant volume in the PT 210, is set to 0, and the pressure variable P1 is initialized with the currently measured pressure value, P.

Figure 4B:
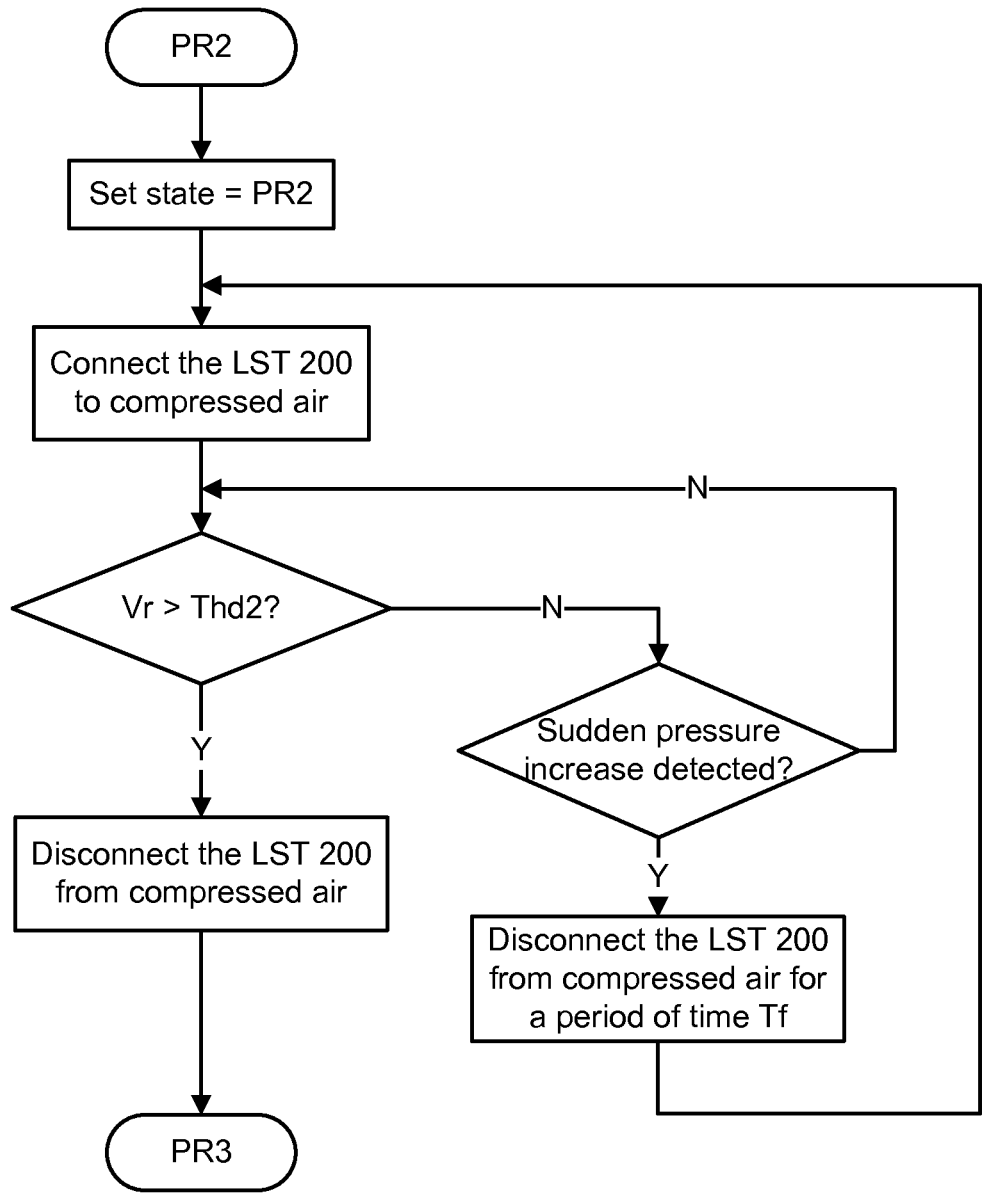
FIG. 4b is a flow chart of a routine for a sub-state PR2 in a Priming state.

A routine for the sub-state PR2 is shown in FIG. 4b. The routine starts with setting the state flag to PR2. Then the LST 200 is fluidly connected to compressed air by connecting the port C of the solenoid valve 246 (FIG. 2) to its port B, and the reductant volume in the PT 210, Vr, is compared to a threshold Thd2. If the reductant level is higher than Thd2, then the LST 200 is disconnected from compressed air by connecting the port C of the control solenoid valve to its port A, and the routine goes into the sub-state PR3. Otherwise, if a sudden pressure increase is detected, i.e., the LST 200 is empty, then the LST 200 is disconnected from compressed air for a period of time Tf for refill. The PR2 restarts after the refill. If there is no sudden pressure increase, the routine then waits until the reductant volume Vr is higher than the threshold Thd2.

Figure 4C:
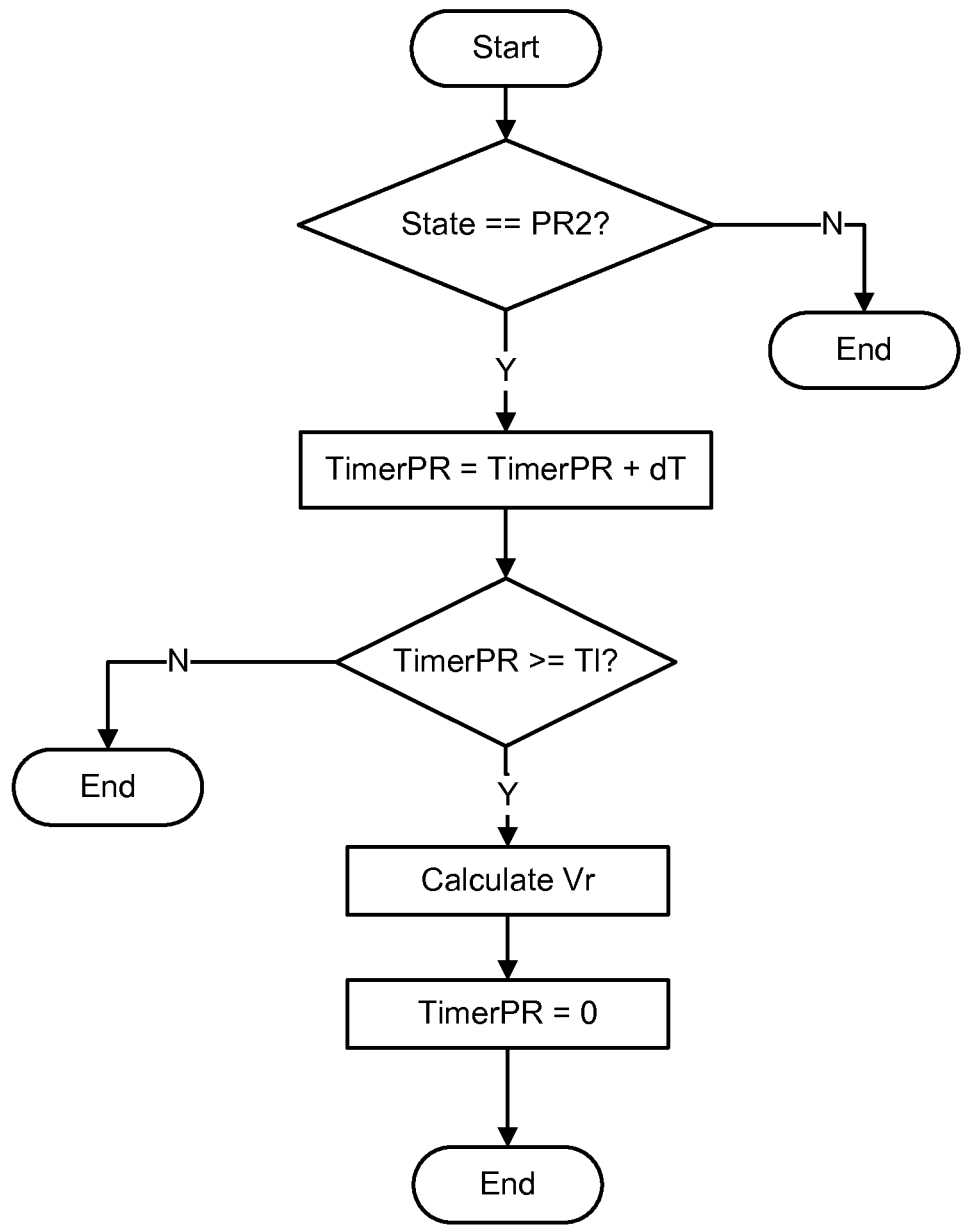
FIG. 4c is a flow chart of a service routine for a timer based interrupt used in a Priming state for calculating reductant volume in a PT.

In the routine of FIG. 4*b*, the reductant volume Vr can be calculated in a service routine running periodically for a timer-based interrupt. As shown in FIG. 4*c*, the interrupt routine starts with checking the State value. If it doesn't equal to PR2, then the routine ends, otherwise, a timer TimerPR is incremented by the execution period value dT. If the TimerPR value is higher or equal to a time value TI, then the Vr value is calculated and the TimerPR is reset to 0. The routine ends thereafter. Since in the sub-state PR1, the reductant volume is re-zeroed, the Vr value can be calculated with the measured pressure values according to the following equation:

$$Vr=Va*(1-P1/P), \qquad (1)$$

where Va is the volume of the trapped air in the PT 200 after the liquid level is re-zeroed. Normally Va is the volume of the PT 200.

Figure 4D:
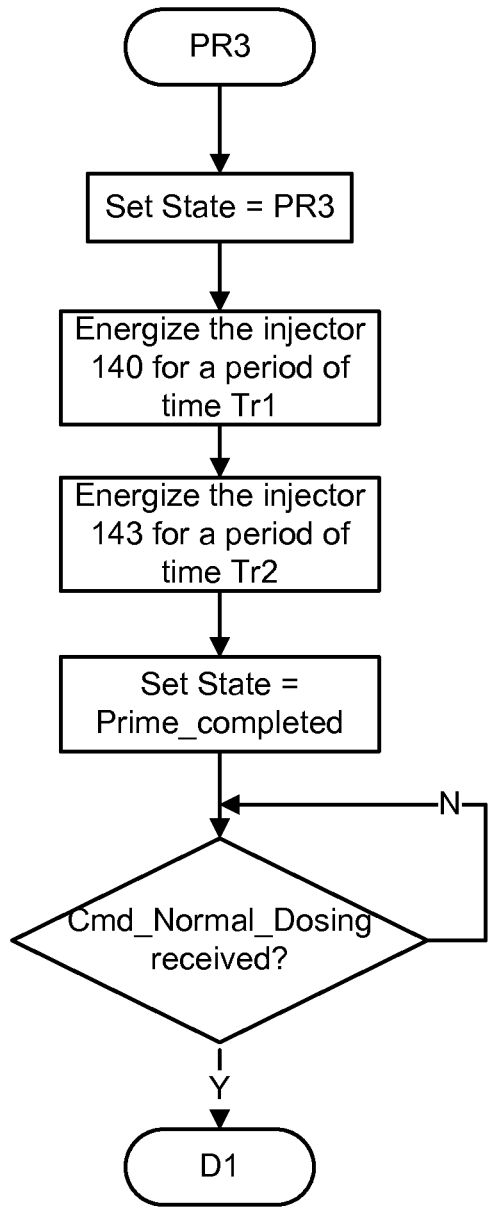
FIG. 4d is a flow chart of a routine for a sub-state PR3 in a Priming state.

The routine enters sub-state PR3 after PR2 is completed. An exemplary PR3 routine is depicted in FIG. 4*d*. At the beginning of this routine, the State value is set to PR3. Then the injecting devices 140 and 143 are energized open respectively for periods of time Tr1 and Tr2 to release trapped air. The State value is set to Prime_completed thereafter and the routine enters sub-state D1 upon receiving a command CMD_Normal_Dosing from the DCU 120.

Figure 5A:
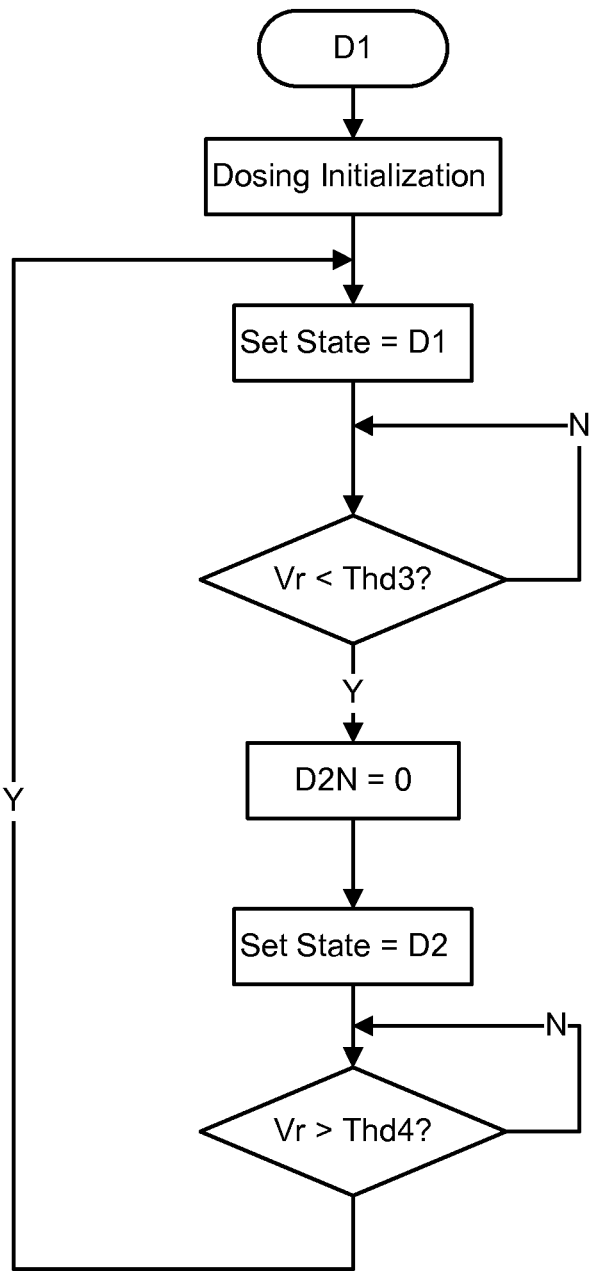
FIG. 5a a flow chart of a routine for a sub-state D1 in a Normal-dosing state.

Referring to FIG. 5*a*, in an exemplary routine of the sub-states D1 and D2, which belong to the Normal-dosing state 320, a dosing initialization sub-routine is executed at the beginning. In the dosing initialization sub-routine, pressure control for the PT 210 and dosing rate control are enabled. After the dosing initialization, the State value is set to D1 and the reductant volume Vr is compared to a threshold Thd3. When the Vr value is higher than the threshold, a variable D2N, which indicates a cycle number in the sub-state D2, is set to 0. The State is then set to D2 and the reductant volume Vr is compared to another threshold Thd4. The routine goes back to setting State to D1 when the Vr value is higher than Thd4.

In the sub-state D1 of FIG. 5*a*, the reductant volume Vr can be measured based on the relation between a reductant volume change and a pressure change in the PT 210, according to the following equations:

$$Vr=Va+P*dV/dP, \qquad (2)$$

where dV is a pressure change that can be calculated using the mass of dosed reductant, Dr:

$$dV=Dr/\rho, \qquad (3)$$

where ρ is the reductant density.

Figure 5B:
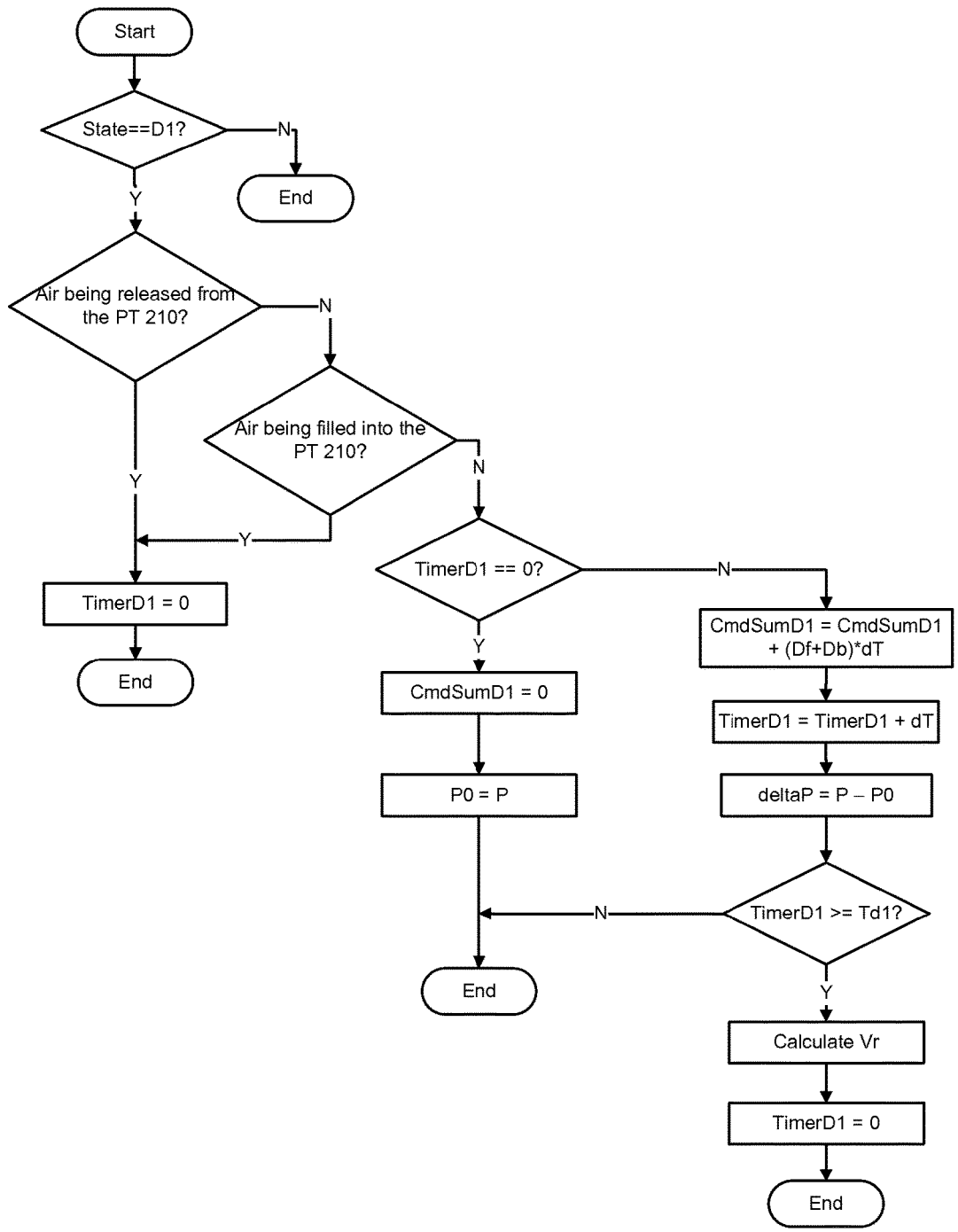
FIG. 5b is a flow chart of a service routine for a timer based interrupt used in a sub-state D1 for calculating reductant volume in a PT.

An interrupt service routine as shown in FIG. 5*b* can be used for the calculation of Vr. The interrupt service routine runs periodically with a timer interrupt. Referring to FIG. 5*b*, at the beginning, the State value is checked. If it doesn't equal to D1, then the routine ends, otherwise, the pressure control status is examined. If compressed air is released from the PT 210, e.g., the solenoid 244 (FIG. 2) is energized open, or compressed air is filled into the PT 200, e.g., the solenoid 240 (FIG. 2) is energized open, then a timer TimerD1 is reset to 0, and the routine ends, otherwise, the value of TimerD1 is examined. If it is 0, then the routine ends after a variable CmdSumD1, the value of which is an accumulated dosing amount during pressure change, is set to 0, and the value of a variable P0 is set to the current pressure sensing value P. If the value of TimerD1 is not 0, then the variable CmdSumD1 is incremented with the dosing mass in the current execution, while the variable TimerD1 is incremented with dT. The pressure change, deltaP, is calculated thereafter and the value of the timer TimerD1 is compared to a pressure sampling time Td1. Upon the TimerD1 value higher than Td1, the reductant volume Vr is calculated using the following equation according to equation (2) and (3), and the routine ends after the variable TimerD1 is set to 0:

$$Vr=Va+P*CmdSumD1/(\rho*deltaP), \qquad (4)$$

where the volume of the PT 210 can be used as the Va value. If the TimerD1 value is not higher than the pressure sampling timeTd1, the routine ends.

In the Normal-dosing state, in the system of FIG. 2, reductant pressure in the PT 210 can be controlled within a pre-determined range through controlling the solenoid valves 240 and 244. And the solenoid valves 240 and 244 have four control modes shown in the following table.

TABLE 1

| Mode number | Status of the valve 240 | Status of the valve 244 | Actions |
| --- | --- | --- | --- |
| 0 | De-energized | De-energized | Keeping air in PT |
| 1 | De-energized | Energized | Releasing air from PT |
| 2 | Energized | De-energized | Filling air to PT |
| 3 | Energized | Energized | Releasing compressed air |

In Mode 0, neither of the solenoid valves 240 and 244 is energized open, and compressed air is trapped in the PT 210. In Mode 1, since the solenoid valve 244 is energized open and the solenoid valve 240 is de-energized closed, compressed air is released from the PT 210. Mode 2 is an air refilling mode. In this mode, the solenoid valve 244 is de-energized closed, disconnecting the PT 210 from ambient, while the solenoid valve 240 is energized open, connecting the PT 210 to the compressed air supply. Mode 3 is a special mode and should be avoided. In this mode, when both of the solenoid valves 240 and 244 are energized open, the compressed air source is fluidly connected to ambient.

Figure 5C:
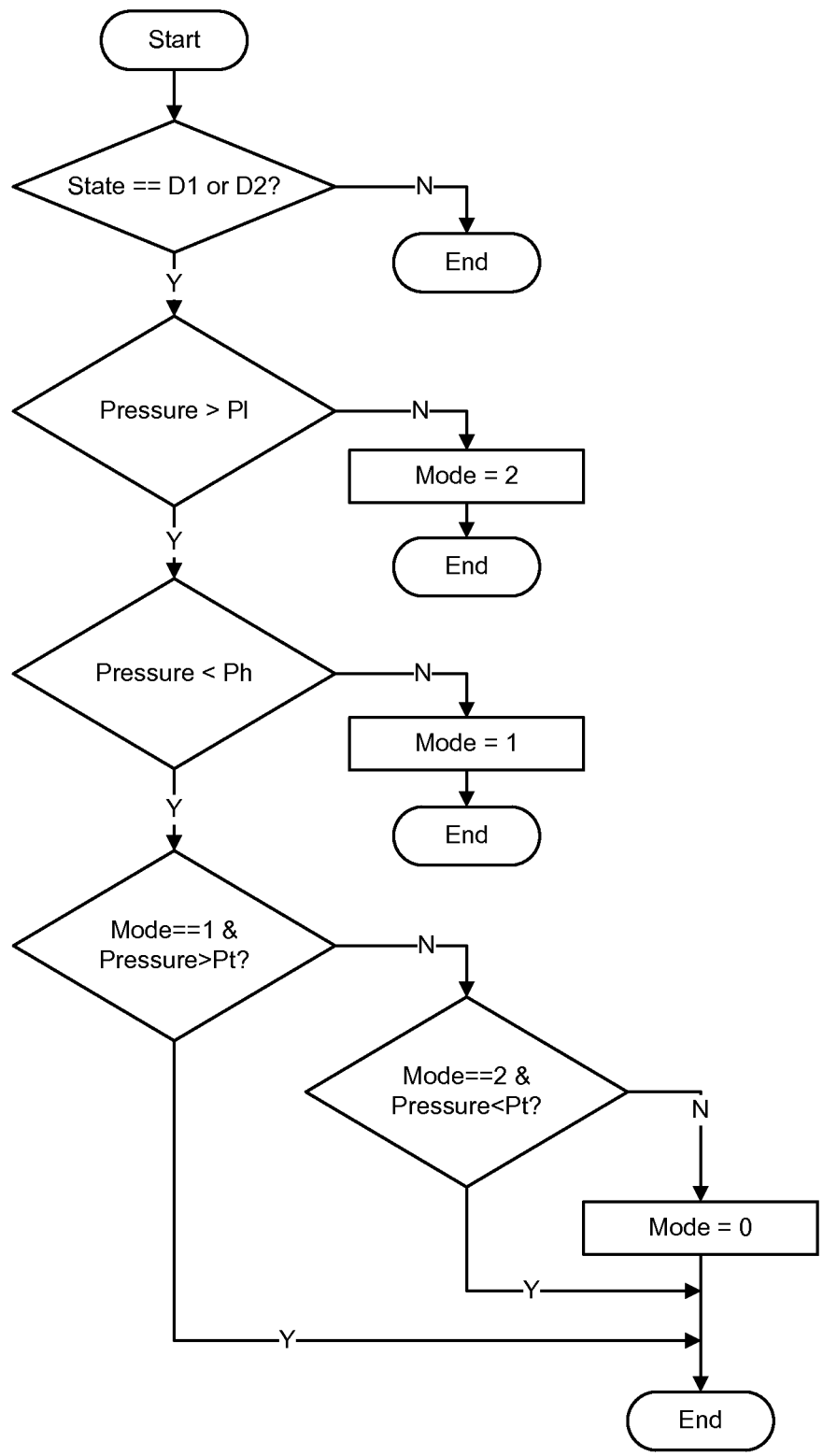
FIG. 5c is a flow chart of a service routine for a timer based interrupt used in a Normal-dosing state for controlling reductant pressure in a PT.

The PT pressure control can also be realized with a service routine running periodically for a timer-based interrupt. Referring to FIG. 5*c*, in an example of the interrupt service routine, the value of a flag, State, is examined first. If it doesn't equal to D1 or D2, then routine ends, otherwise, the currently measured pressure value is compared to the lower end of a pre-determined range, Pl. If it is not higher than Pl, then the pressure control mode is set to 2 to refill compressed air into the PT 210, and the routine ends, otherwise, the pressure value is compared to an upper end of the pre-determined range, Ph. If it is not lower than Ph, then the pressure control mode is set to 1, and the routine ends, otherwise, the pressure control keeps its previous value when one of two conditions is satisfied:
1. The pressure control mode is 1 and the pressure is higher than the middle value of the pre-determined range, Pt; 2. The pressure control mode is 2 and the pressure is lower than Pt. The pressure control mode is set to 0 if neither of these two conditions is satisfied, and the routine ends thereafter.

Figure 5D:
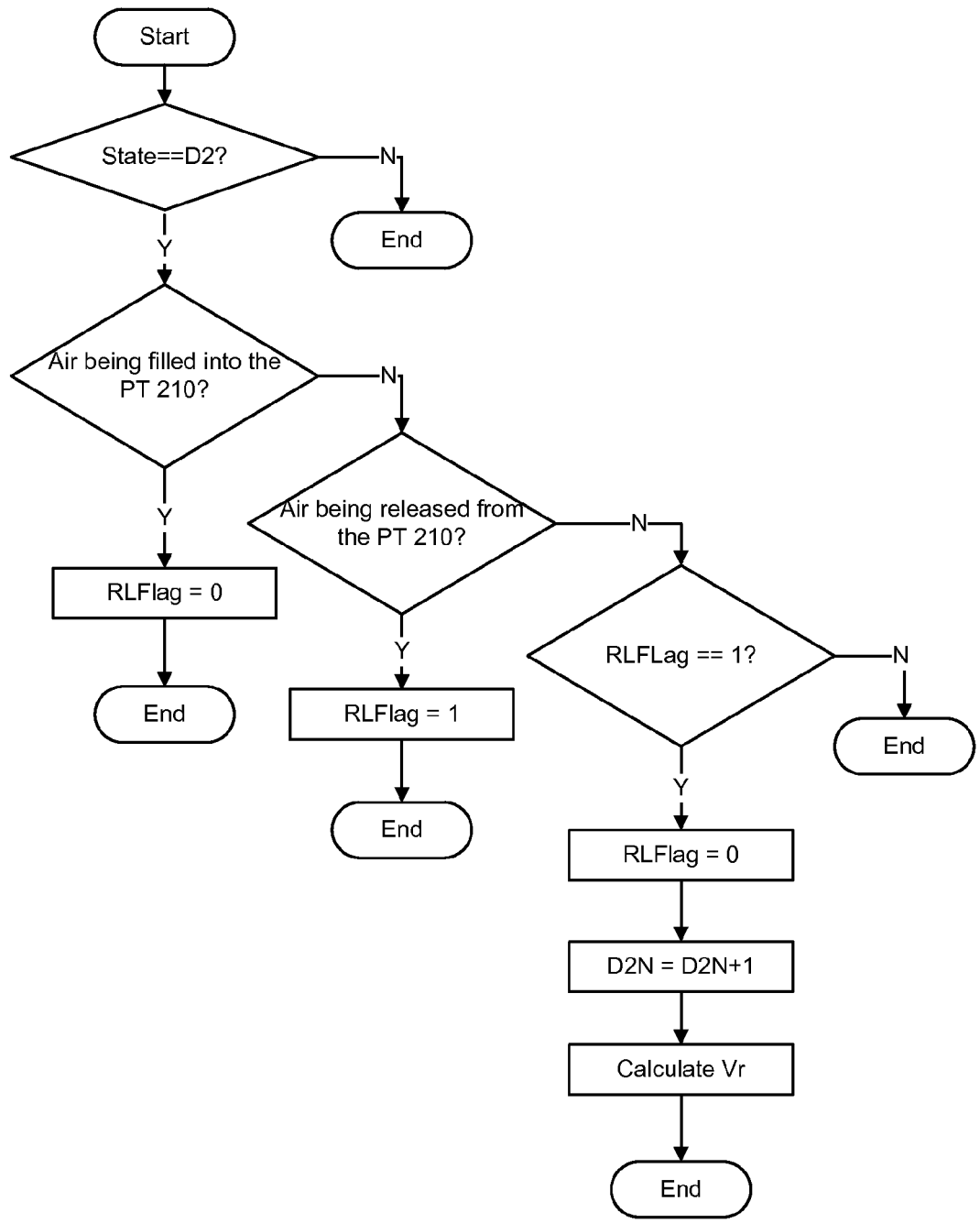
FIG. 5d is a flow chart of a service routine for a timer based interrupt used in a sub-state D2 for calculating reductant volume in a PT.

In the sub-state D2, the reductant volume Vr can be measured with a service routine for a timer-based interrupt, as shown in FIG. 5d. The routine starts with checking the State value. If it doesn't equal to D2, then the routine ends, otherwise, the pressure control status is checked. When the pressure control is in mode 2, i.e., when compressed air is being filled into the PT 210, the routine ends after a flag RLFlag is reset to 0. The flag RLFlag is set to 1 if the pressure control is in mode 1, i.e., compressed air is being released from the PT 210. When the pressure control is in mode 0, i.e., compressed air is being trapped in the PT 210, the RLFlag value is examined. If RLFlag is not 1, the routine ends, otherwise, RLFlag is reset to 0, and the variable D2N is incremented by 1, and the reductant volume Vr is calculated before the routine ends.

With the pressure control algorithm of FIG. 5c, the reductant volume Vr can be calculated with the D2N value and the dosing mass CmdSumD2. In the pressure control, each time when the control mode changes from 1 to 0, (i.e., the RLFlag value changes from 1 to 0) compressed air is released, and the pressure value changes from Ph to Pt. According to the ideal gas law, when there is no temperature change, the reductant volume change in each cycle when the pressure increases from Pt to Ph is determined by the values of Pt and Ph:

$$Vr(Ph)=Va-[Va-Vr(Pt)]*Ph/Pt,\qquad(5)$$

where Vr(Ph) is the reductant volume at pressure Ph, and Vr(Pt) is the reductant volume at pressure Pt. Accordingly, when pressure releasing time is short, in the routine of FIG. 5d, the reductant volume Vr then can be calculated according to the equation:

$$Vr(D2N)=Va-[Va-Vr(D2N-1)]*Ph/Pt,\qquad(6)$$

where Vr(D2N) and Vr(D2N-1) are the reductant volume values in cycles D2N and D2N-1. In the equation (6), since Pt and Ph are pre-determined values, and Va is a constant, when the change in Vr value in releasing air is negligible, the only factors that determine the Vr value are the cycle number D2N and the initial Vr value, which is the value of Vr when the sub-state D2 starts. If the initial Vr value is set to a constant value, then the D2N number can be used directly in FIG. 5a in determining if the routine needs to go back to the sub-state D1.

Figure 5E:
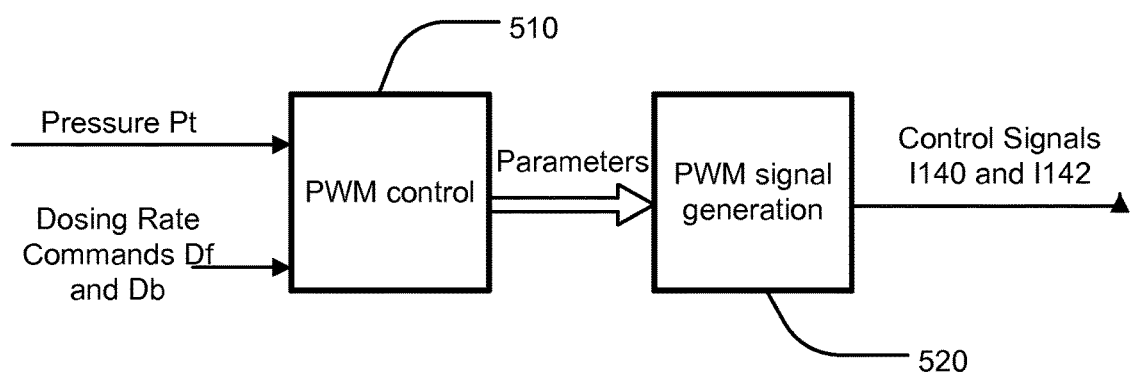
FIG. 5e is a block diagram of a PWM controller for controlling reductant dosing rate.

Referring back to FIG. 3c, in the sub-state 323 (Dosing-rate control), a PWM control as shown in FIG. 5e can be used in controlling dosing rate. In this control, the sensing value Pt obtained from the pressure sensor 220 is sent to a PWM control block 510 together with dosing rate commands Df and Db generated in the SCR control unit 350. The PWM control block 510 then calculates the values of control parameters for a PWM signal generation block 520, wherein the control signals 1140 and 1143 are generated and provided respectively to the injectors 140 and 143 through signal lines 123 and 127.

Figure 6A:
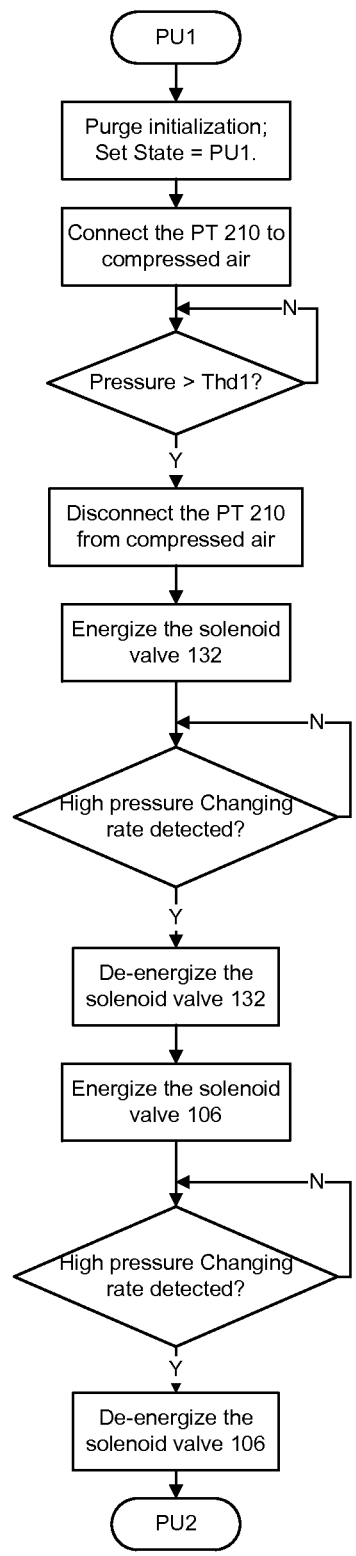
FIG. 6a is a flow chart of a routine for a sub-state PU1 in a Purge state.
Figure 6B:
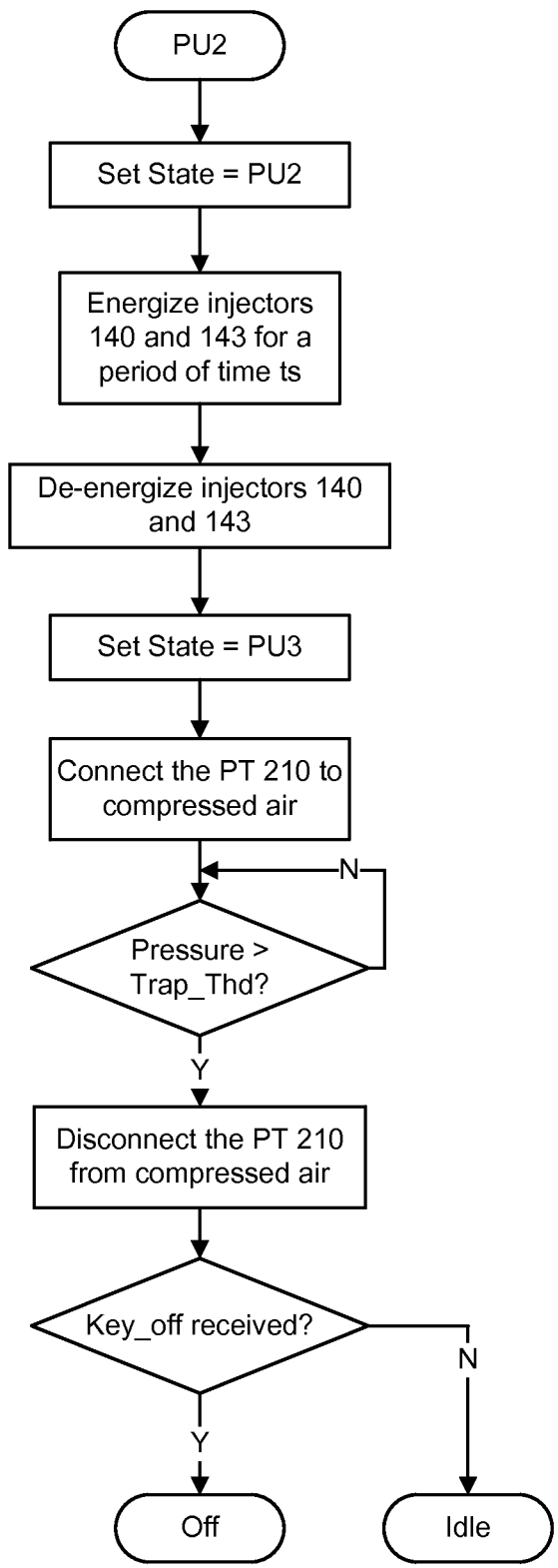
FIG. 6b is a flow chart of a routine for a sub-state PU2 in a Purge state.

Referring back to FIG. 3c, in the Priming state 310 and the Normal-dosing state 320, whenever a command CMD-Idle or a Key-Off signal is received, the control enters the Purge state 330, which includes three sub-states, PU1, PU2, and PU3. The sub-state PU1 can be realized with a routine as shown in FIG. 6a. In this routine, the system is initialized at the beginning. In the initialization process, both of the solenoid valves and the injector are de-energized. After the initialization, the state flag is set to PU1 and the PT 210 is connected to compressed air to build up pressure. When the pressure in the PT 210 is higher than a threshold Thd1, the PT 210 is disconnected from compressed air, and the solenoid valve 132 is energized open. Under the pressure in the LST 200, reductant residue in the LST 200 flows back to the reductant tank 120. When a high pressure changing rate is detected, indicating the LST 200 and the fluid path from the LST 200 to the solenoid valve 132 is empty, the solenoid valve 132 is de-energized closed, and the solenoid 106 is energized open. After another high pressure changing rate is detected, the solenoid 106 is de-energized closed and the routine enters the sub-state PU2.

Figure 7A:
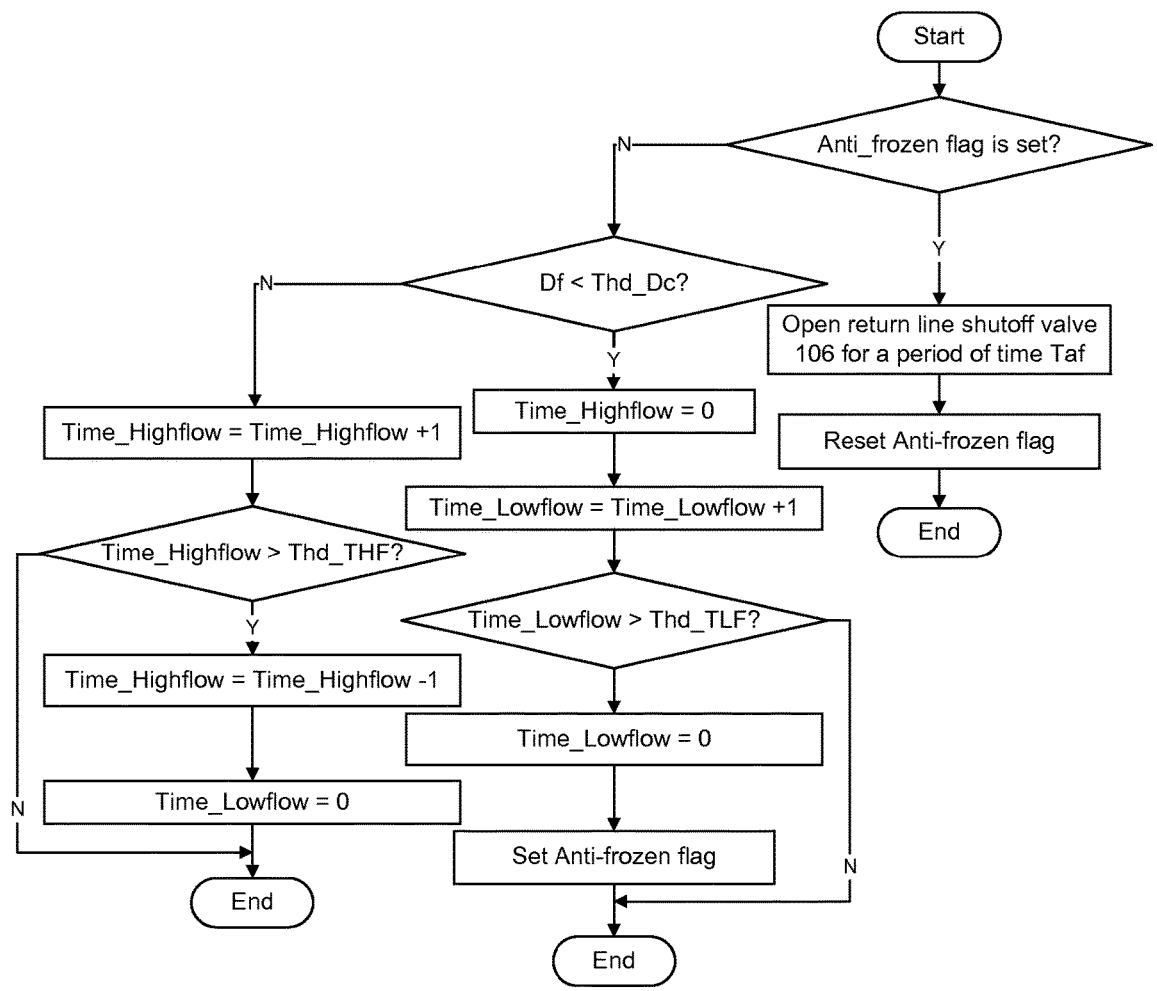
FIG. 7a is a flow chart of a routine for maintaining reductant temperature in front SCR dosing lines.
Figure 7B:
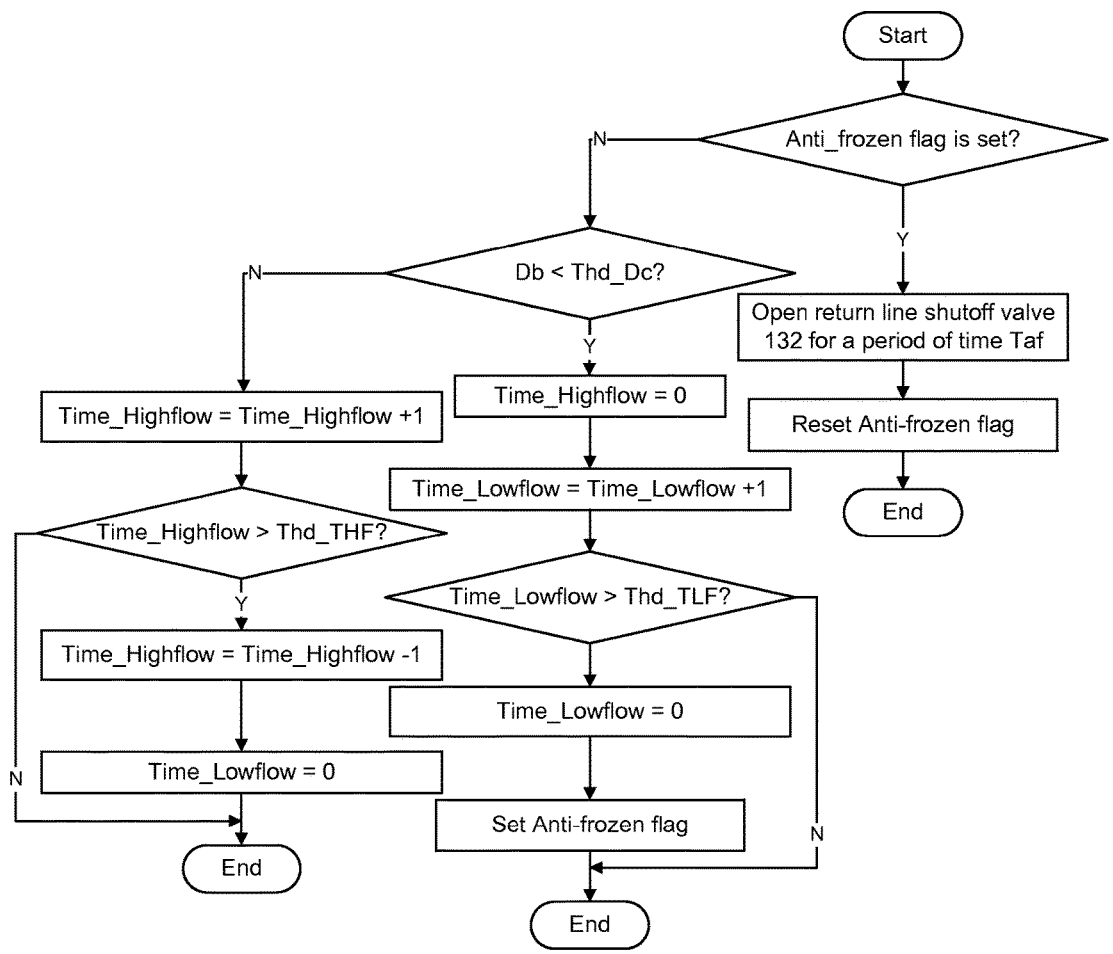
FIG. 7b is a flow chart of a routine for maintaining reductant temperature in back SCR dosing lines.

A routine with a flow chart depicted in FIG. 7b can be used for the sub-states PU2 and PU3. This routine starts with setting the State to PU2. Then the injecting devices 140 and 143 are energized open for a period of time is to purge reductant residue into exhaust pipe. The injecting devices are de-energized thereafter and the State is set to PU3. In the sub-state PU3, the PT 210 is connected to compressed air to refill air into it. When the pressure in the PT 210 is higher than a threshold Trap_Thd, the refill stops, and a key flag is examined. If the key flag value is Key_off, then the control goes into the Off state 301, otherwise, the control enters the Idle state 302.

Referring back to FIG. 1, when an air-driven pump is as shown in FIG. 2 is used in the reductant delivery module 110 and positioned in the reductant tank 100 (FIG. 1), electrical heating is no longer required in thawing reductant in the pump and maintaining temperature above its frozen point, since the heating means in the reductant tank, which typically is a fluid heating apparatus with engine coolant cycling inside it, can be used for heating reductant in both of the reductant tank and the pump.

Furthermore, when the air-driven pump is used in the reductant delivery module, reductant residue can be purged after dosing and reductant temperature can be maintained at a level higher than frozen point by cycling warm reductant from the reductant tank 100, in which reductant is heated, through solenoid valves 106 and 132, thereby heating means for reductant passages and connectors, which are normally required in a SCR system to thaw reductant residue and maintain its temperature above frozen point, can be saved.

The maintenance heating with reductant cycling can be realized by using service routines running periodically for a timer based interrupt as shown in FIGS. 7a and 7b, and the timer based interrupt for these routines is enabled when ambient temperature is lower than a threshold. In the service routine of FIG. 7a, after the service routine starts, an Anti-frozen flag is examined. If it is set, then the return line shutoff valve 106 is opened for a period of time Taf, and after the Anti-frozen flag is reset, the routine ends. Otherwise, the dosing rate Df is compared with a threshold Thd_Dc. If it is higher than Thd_Dc, then a timer Time_Highflow is reset to zero, and another timer Time_Lowflow is incremented by one. The value of the timer Time_Lowflow is compared with a threshold Thd_TLF thereafter. The routine ends if the Tme_Lowflow value is higher than Thd_TLF, otherwise, the timer Time_Lowflow is reset to zero, and the routine ends after the flag Anti-frozen is set. Referring back to the comparison between the dosing rate Df and the threshold Thd_Dc, if it is not lower than Thd_Dc, then the timer Time_Highflow is incremented by one, and its value is compared to a threshold Thd_THF. The routine ends if the Time_Highflow value is not higher than Thd_THF, otherwise, the timer Time_Highflow is decremented by one to avoid overflow, and routine ends after the timer Time_Lowflow is reset to zero. The service routine of FIG. 7b is the same as that of FIG. 7a, except the solenoid valve is 132 and the dosing rate is Db.

Figure 8A:
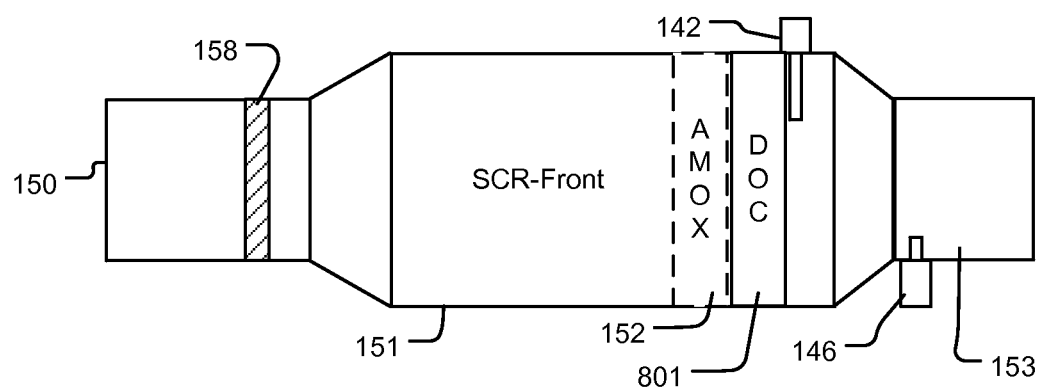
FIG. 8a is a schematic representation of a front SCR device with a DOC positioned downstream from it and a NOx sensor positioned downstream from the DOC.

FIGS. 3-7 depict controls for a SCR system of FIG. 1. The controls can also be used for multi-stage SCR systems with different configurations. For example, to have a SCR system less sensitive to catalyst aging, a front SCR device with lower deNOx efficiency requirement is preferred. In the system of FIG. 1, to lower the deNOx efficiency requirement to the front SCR device, a higher deNOx efficiency of the back SCR device is needed. The deNOx efficiency of the back SCR device can be increased with fast SCR reactions, in which both of NO and NO2 reacts with ammonia. The AMOX 152 can be used for oxidizing NO to $NO_2$, however, to avoid too much NOx being produced from ammonia slips produced in the front SCR device, a high performance AMOX is preferred, and adjusting AMOX coating for oxidizing NO may affect its ammonia cleaning performance. Another method is using a DOC. As shown in FIG. 8a, in a SCR system, the front SCR catalyst 151 can be followed by the AMOX 152 and a DOC 801. In this system, in addition to generating more $NO_2$ for the back SCR device, the DOC can also oxidize unburned HC and CO, improving the performance of catalysts downstream.

Figure 8B:
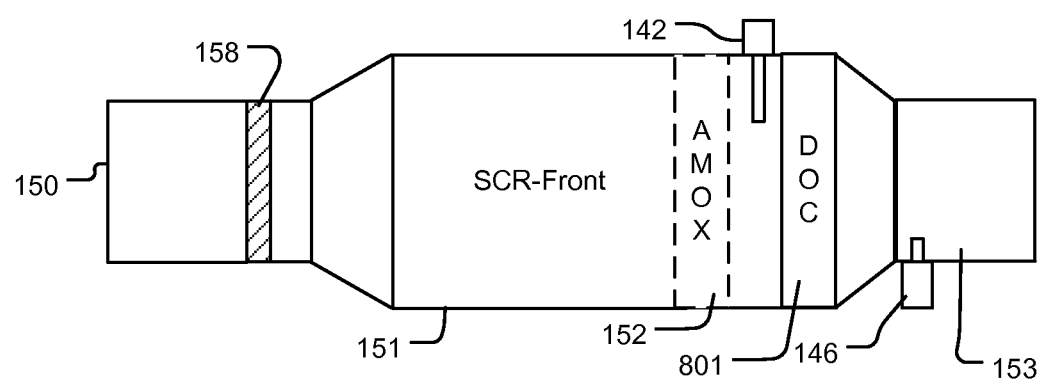
FIG. 8b is a schematic representation of a front SCR device with a NOx sensor positioned downstream from it and a DOC positioned downstream from the NOx sensor.

For NOx sensors sensitive to ammonia, ammonia in exhaust gas may cause issues in controlling reductant dosing. For example, if ammonia generated by reductant dosing is partially sensed in NOx reading, then higher dosing rate could cause higher NOx reading, resulting in dosing rate increase and dosing saturation due to positive feedback. To prevent reductant dosing in the back SCR device from affecting ammonia reading through the NOx sensor positioned in between the front and the back SCR devices, as shown in FIG. 8b, the NOx sensor 142 can be positioned in between the AMOX 152 and the DOC 801. In the configuration of FIG. 8b, the DOC 801 has three functions: oxidizing unburned HC and CO, generating more NO2, and isolating reductant dosing from NOx sensing.

While the present invention has been depicted and described with reference to only a limited number of particular preferred embodiments, as will be understood by those of skill in the art, changes, modifications, and equivalents in form and function may be made to the invention without departing from the essential characteristics thereof. Accordingly, the invention is intended to be only limited by the spirit and scope as defined in the appended claims, giving full cognizance to equivalents in all respects.

The invention claimed is:

1. An exhaust gas after-treatment apparatus for an internal combustion engine, comprising:
   a first selective catalytic reduction device;
   a first reductant injecting device positioned upstream from said first selective catalytic reduction device;
   a second selective catalytic reduction device located downstream from said first selective catalytic reduction device;
   a second reductant injecting device, which is fluidly connected to said first reductant injecting device, positioned in between said first selective catalytic reduction device and said second selective catalytic reduction device;
   a mixing device positioned in between said second reductant injecting device and said second catalytic reduction device for creating a uniform exhaust gas;
   a reductant delivery module including a pressure outlet port fluidly connected to said first reductant injecting device and said second reductant injecting device, and a first reductant-flow control valve for allowing and shutting off a reductant flow passing therethrough fluidly coupling said first reductant injecting device to a reductant tank; and
   a dosing control unit configured to control said first reductant injecting device to deliver a first dosing quantity of reductant in response to a first dosing rate command, and control said second reductant injecting device to deliver a second dosing quantity of reductant in response to a second dosing rate command.

2. The apparatus of claim 1, further comprising:
   a diesel oxidation catalyst located in between said first selective catalytic reduction device and said second reductant injecting device.

3. The apparatus of claim 1, wherein said control module is further configured to determine predicted $NO_x$ values according to a predetermined relationship between engine control parameters, including fueling rate, fueling timing, and engine speed associated with said internal combustion engine, and a $NO_x$ level in exhaust gas generated by said internal combustion engine, and generate said first dosing rate command in response to at least said predicted NOx values.

4. The apparatus of claim 1, further comprising:
   a NOx sensor positioned in between said first selective catalytic reduction device and said second reductant injecting device providing NOx sensing values indicative of a NOx level in an exhaust gas flow downstream from said first selective catalytic reduction device, and said control module is further configured to generate said second dosing rate command in response to at least said NOx sensing values.

5. The apparatus of claim 1, wherein said reductant delivery module further includes a liquid supply tank having a liquid inlet port fluidly coupled to said reductant tank through a first check valve, a liquid outlet port for reductant inside said liquid supply tank to flow out, a first gas port fluidly connected to a first air-flow control unit, and a pressure tank fluidly connected to said pressure outlet port comprising a pressure inlet port fluidly coupled to said liquid outlet port through a second check valve.

6. The apparatus of claim 5, wherein said second reductant injecting device is fluidly coupled to said reductant tank through a second reductant-flow control valve for allowing and shutting off a reductant flow passing therethrough.

7. The apparatus of claim 6, wherein said dosing control unit is further configured to energize said first reductant-flow control valve and said second reductant-flow control valve open allowing a reductant flow passing therethrough after a dosing process completes.

8. The apparatus of claim 6, further comprising a temperature sensor providing temperature sensing values indicative of an ambient temperature.

9. The apparatus of claim 8, wherein said dosing control unit is further configured to energize said first reductant-flow control valve and said second reductant-flow control valve open allowing a reductant flow passing therethrough when said temperature sensing values indicate that said ambient temperature is lower than a predetermined threshold.

10. The apparatus of claim 5, wherein said first air-flow control unit includes at least one air-flow control valve for allowing and shutting off an air flow passing therethrough, and is fluidly connected to a compressed air source and ambient.

11. The apparatus of claim 10, wherein said dosing control unit is further configured to control a reductant pressure in said liquid supply tank by operating said at least one air-flow control valve in said first air-flow control unit to feed compressed air into said liquid supply tank and release compressed air from said liquid supply tank to ambient.

12. The apparatus of claim 5, wherein said pressure tank further includes a second gas port fluidly connected to a second air-flow control unit, which has at least one air-flow control valve for allowing and shutting off an air flow passing therethrough, and is fluidly connected to a compressed air source and ambient.

13. The apparatus of claim 12, wherein said dosing control unit is further configured to control a reductant pressure in said pressure tank by operating said at least one air-flow control valve in said second air-flow control unit to feed compressed air into said pressure tank and release compressed air from said pressure tank to ambient.

14. The apparatus of claim 13, wherein said reductant delivery module further includes a pressure sensor providing pressure sensing values indicative of said reductant pressure in said pressure tank, and said dosing control unit is further configured to control said reductant pressure in response to at least said pressure sensing values.

15. The apparatus of claim 5, wherein said dosing control unit is further configured to energize said first reductant-flow control valve open allowing a reductant flow passing therethrough after a dosing process completes.

16. The apparatus of claim 5, further comprising a temperature sensor providing temperature sensing values indicative of an ambient temperature.

17. The apparatus of claim 16, wherein said dosing control unit is further configured to energize said first reductant-flow control valve open allowing a reductant flow passing therethrough when said temperature sensing values indicate that said ambient temperature is lower than a predetermined threshold.

* * * * *